(12) United States Patent
Kobayashi

(10) Patent No.: US 9,646,111 B2
(45) Date of Patent: May 9, 2017

(54) PROCESS MONITORING SYSTEM AND METHOD

(71) Applicant: YOKOGAWA ELECTRIC CORPORATION, Musashino-shi, Tokyo (JP)

(72) Inventor: Satoshi Kobayashi, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 985 days.

(21) Appl. No.: 13/918,219

(22) Filed: Jun. 14, 2013

(65) Prior Publication Data

US 2013/0338964 A1 Dec. 19, 2013

(30) Foreign Application Priority Data

Jun. 19, 2012 (JP) ................................ 2012-137760

(51) Int. Cl.
*G05B 9/02* (2006.01)
*G06F 17/40* (2006.01)
*G05B 23/02* (2006.01)

(52) U.S. Cl.
CPC ......... *G06F 17/40* (2013.01); *G05B 23/0216* (2013.01); *G05B 23/0229* (2013.01); *G05B 2219/31288* (2013.01); *G05B 2219/34477* (2013.01)

(58) Field of Classification Search
USPC .................................................... 700/79, 80
See application file for complete search history.

(56) References Cited

U.S. PATENT DOCUMENTS

2010/0318856 A1 12/2010 Yoshida
2012/0041575 A1 2/2012 Maeda et al.

FOREIGN PATENT DOCUMENTS

| JP | 06-060826 B2 | 8/1994 |
|---|---|---|
| JP | 3012297 B2 | 2/2000 |
| JP | 3631118 B2 | 3/2005 |
| JP | 2007-011686 A | 1/2007 |

*Primary Examiner* — Lam Nguyen
(74) *Attorney, Agent, or Firm* — Westerman, Hattori, Daniels & Adrian, LLP

(57) ABSTRACT

A process monitoring system may include: a storage unit configured to store time-sequence data, which is output from a field device located in a plant for measuring a state quantity, and log data, which includes handing procedures performed in past; a prediction unit configured to predict a time variation of the state quantity by using the time-sequence data output from the field device; and an extraction unit configured to extract the time-sequence data similar to the time variation of the state quantity, which has been predicted by the prediction unit, from the time-sequence data, which has been stored in the storage unit, the extraction unit being configured to extract the handling procedures, which has been performed at a time, when the time-sequence data that has been extracted is obtained, from the log data that has been stored in the storage unit.

16 Claims, 4 Drawing Sheets

PROCESS MONITORING SYSTEM AND METHOD

BACKGROUND OF THE INVENTION

Field of the Invention

The present invention relates to a process monitoring system and method.

Priority is claimed on Japanese Patent Application No. 2012-137760, filed Jun. 19, 2012, the content of which is incorporated herein by reference.

Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, in plants, factories, and the like, process monitoring systems are implemented which monitor various state quantities such as pressure, temperature, and flow amount in an industrial process, with advanced automated operation implemented, based on the monitoring results of the processing monitoring system. A process monitoring system is generally constituted by on-site devices such as measuring instruments and actuators, which are called field devices, a controller that controls them, and a processing monitoring apparatus that monitors state quantities.

The process monitoring apparatus collects information indicating various state quantities, which are the measurement results of field device that are acquired by the controller. The process monitoring apparatus displays the current values of state quantities measured by one or a plurality of field devices, and trend graphs, which are graphs of the time variation of state quantities measured by specific field devices. The process monitoring apparatus displays, along with the current values of state quantities and trend graphs, the upper thresholds and lower thresholds of state quantities, and issues an alarm to notify of an abnormality when a state quantity exceeds a threshold. A plant operator refers to the content displayed on the process monitoring apparatus to understand the state of the process and operates the process monitoring apparatus as required.

Japanese Examined Patent Application, Second Publication No. H6-60826, Japanese Patent (Granted) Publication Nos. 3012297 and 3631118, and Japanese Unexamined Patent Application, First Publication No. 2007-11686 disclose conventional art for diagnosis and the like of abnormalities occurring in a plant or the like. Specifically, Japanese Examined Patent Application, Second Publication No. H6-60826, and Japanese Patent (Granted) Publication Nos. 3012297 and 3631118 disclose art that uses simulation and a neural network to identify an abnormality. Japanese Unexamined Patent Application, First Publication No. 2007-11686 discloses art whereby time-sequence data during plant operation and information regarding plant operation are associated and stored in a storage unit, and whereby specific time-sequence data resembling time-sequence data based on the current plant operation is selected from the time-sequence data stored in the storage unit, and the information associated with the selected specific time-sequence data is acquired.

In recent years, efforts are being made to digitalize and impart intelligence to the above-described field devices, and it has become possible to collect a large amount of diverse information from field devices. With the ability to collect such a large amount of diverse information, because the amount of information required for process control becomes large, the possibility of implementing process control that is more accurate and more efficient than conventionally possible is envisioned. When the collected information becomes diverse and increases in quantity, along with an increase in the number of items to be monitored by plant operators, the scope of the monitoring broadens, as does the burden on operators.

To achieve process control that is both accurate and efficient, it is necessary to grasp fine variations in state quantities as quickly as possible. In order to improve the overall production efficiency in a plant or the like, it is insufficient to only control so as to achieve the optimum state in a part of the process steps, and it is necessary to implement high-level control that considers the states in upstream and downstream process steps relative to a process step. Conventionally, because an operator referred to the current values and trend graphs of state quantities to judge the state of the plant, unless the operator is sufficiently experienced, fine variations in state quantities are overlooked, making it difficult to achieve a highly efficient process.

If the art disclosed in Japanese Examined Patent Application, Second Publication No. H6-60826, Japanese Patent (Granted) Publication Nos. 3012297 and 3631118, and Japanese Unexamined Patent Application, First Publication No. 2007-11686 is used, an operator not having a high level of experience can be aided to some extent. However, because an operator must make the ultimate judgment of the state of the plant, the achievement of a high-efficiency process still requires an operator with a high level of experience. Additionally, in a situation in which the information obtained from field devices becomes diverse and increases in quantity, the burden on even a highly experienced operator increases, bringing conventional monitoring methods close to their limit.

SUMMARY

A process monitoring system may include: a storage unit configured to store time-sequence data, which is output from a field device located in a plant for measuring a state quantity, and log data, which includes handing procedures performed in past; a prediction unit configured to predict a time variation of the state quantity by using the time-sequence data output from the field device; and an extraction unit configured to extract the time-sequence data similar to the time variation of the state quantity, which has been predicted by the prediction unit, from the time-sequence data, which has been stored in the storage unit, the extraction unit being configured to extract the handling procedures, which has been performed at a time, when the time-sequence data that has been extracted is obtained, from the log data that has been stored in the storage unit.

The process monitoring system may further include: a display unit configured to display the handling procedures that have been extracted by the extraction unit.

The process monitoring system may further include: the field device.

The prediction unit may be configured to predict the time variation of the state quantity in a case, in which operations are performed by the handling procedures, by using the time-sequence data, which has been output from the field device, and the handling procedures, which has been extracted by the extraction unit. The display unit may be configured to display prediction results that have been predicted by the prediction unit in the case in which the operations are performed by the handling procedures.

The extraction unit may be configured to extract a plurality of time-sequence data and a plurality of handling procedures. The prediction unit may be configured to predict respectively the time variation of the state quantity in the case in which the operations by each of the plurality of handling procedures, which have been extracted by the extraction unit, are performed.

The extraction unit may be configured to extract, of the time-sequence data that has been stored in the storage unit, the data sequentially in order of having a higher similarity to the time variation of the state quantity that has been predicted by the prediction unit.

The process monitoring system may further include: a procedure data creation unit configured to create procedure data for executing the handling procedures by using the log data that has been stored in the storage unit; and an execution unit configured to execute the procedure data that has been created by the procedure data creation unit.

The process monitoring system may further include: a controller configured to control the field device in response to an instruction from the display unit, the controller being configured to transmit data obtained by controlling the field device to data server via a control network.

The data transmitted from the controller to the data server may include at least one of measurement data sequentially obtained from the field device; control data sequentially output to the field device; and data that is calculated from at least one data from a plurality of measurement data, which is obtained from at least one field device, and a plurality of control data, which is output to at least one field device.

A process monitoring method for monitoring an industrial process implemented at a plant may include: a prediction step of predicting a time variation of a state quantity in the industrial process by using time-sequence data output from a field device for measuring the state quantity; and an extraction step of extracting the time-sequence data similar to the time variation of the state quantity, which has been predicted in the prediction step, from the time-sequence data, which has been stored in a storage unit that stores time-sequence data which is output from the field device and log data which includes handing procedures performed in past, and extracting the handling procedures, which has been performed at a time, when the time-sequence data that has been extracted is obtained, from the log data that has been stored in the storage unit.

The process monitoring method may further include: a display step of displaying the handling procedures that have been extracted in the extraction step.

The prediction step may include predicting the time variation of the state quantity in a case, in which operations are performed by the handling procedures, by using the time-sequence data, which has been output from the field device, and the handling procedures, which has been extracted by the extraction unit. The display step may include displaying prediction results that have been predicted by the prediction unit in the case in which the operations are performed by the handling procedures.

The extraction step may include extracting a plurality of time-sequence data and a plurality of handling procedures. The prediction step may include predicting respectively the time variation of the state quantity in the case in which the operations by each of the plurality of handling procedures, which have been extracted by the extraction unit, are performed.

The extraction step may include extracting, of the time-sequence data that has been stored in the storage unit, the data sequentially in order of having a higher similarity to the time variation of the state quantity that has been predicted in the prediction step.

The process monitoring method may further include: a procedure step of creating procedure data for executing the handling procedures by using the log data that has been stored in the storage unit; and an execution step of executing the procedure data that has been created by the procedure step.

A computer program product embodied on a non-transitory computer readable medium may include: instructions to store time-sequence data, which is output from a field device located in a plant for measuring a state quantity, and log data, which includes handing procedures performed in past, in a storage unit; instructions to predict a time variation of the state quantity by using the time-sequence data output from the field device; instructions to extract the time-sequence data similar to the time variation of the state quantity, which has been predicted, from the time-sequence data, which has been stored in the storage unit, and to extract the handling procedures, which has been performed at a time, when the time-sequence data that has been extracted is obtained, from the log data that has been stored in the storage unit; and instructions to display the handling procedures that have been extracted.

The computer program product may further include: instructions to predict the time variation of the state quantity in a case, in which operations are performed by the handling procedures, by using the time-sequence data, which has been output from the field device, and the handling procedures, which has been extracted; and instructions to display prediction results that have been predicted in the case in which the operations are performed by the handling procedures.

The computer program product may further include: instructions to extract a plurality of time-sequence data and a plurality of handling procedures; and instructions to predict respectively the time variation of the state quantity in the case in which the operations by each of the plurality of handling procedures, which have been extracted, are performed.

The computer program product may further include: instructions to extract, of the time-sequence data that has been stored in the storage unit, the data sequentially in order of having a higher similarity to the time variation of the state quantity that has been predicted.

The computer program product may further include: instructions to create procedure data for executing the handling procedures by using the log data that has been stored in the storage unit; and instructions to execute the procedure data that has been created.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

A process monitoring system and method in accordance with a first preferred embodiment of the present invention will be described below in detail, with references made to the drawings.

Figure 1:
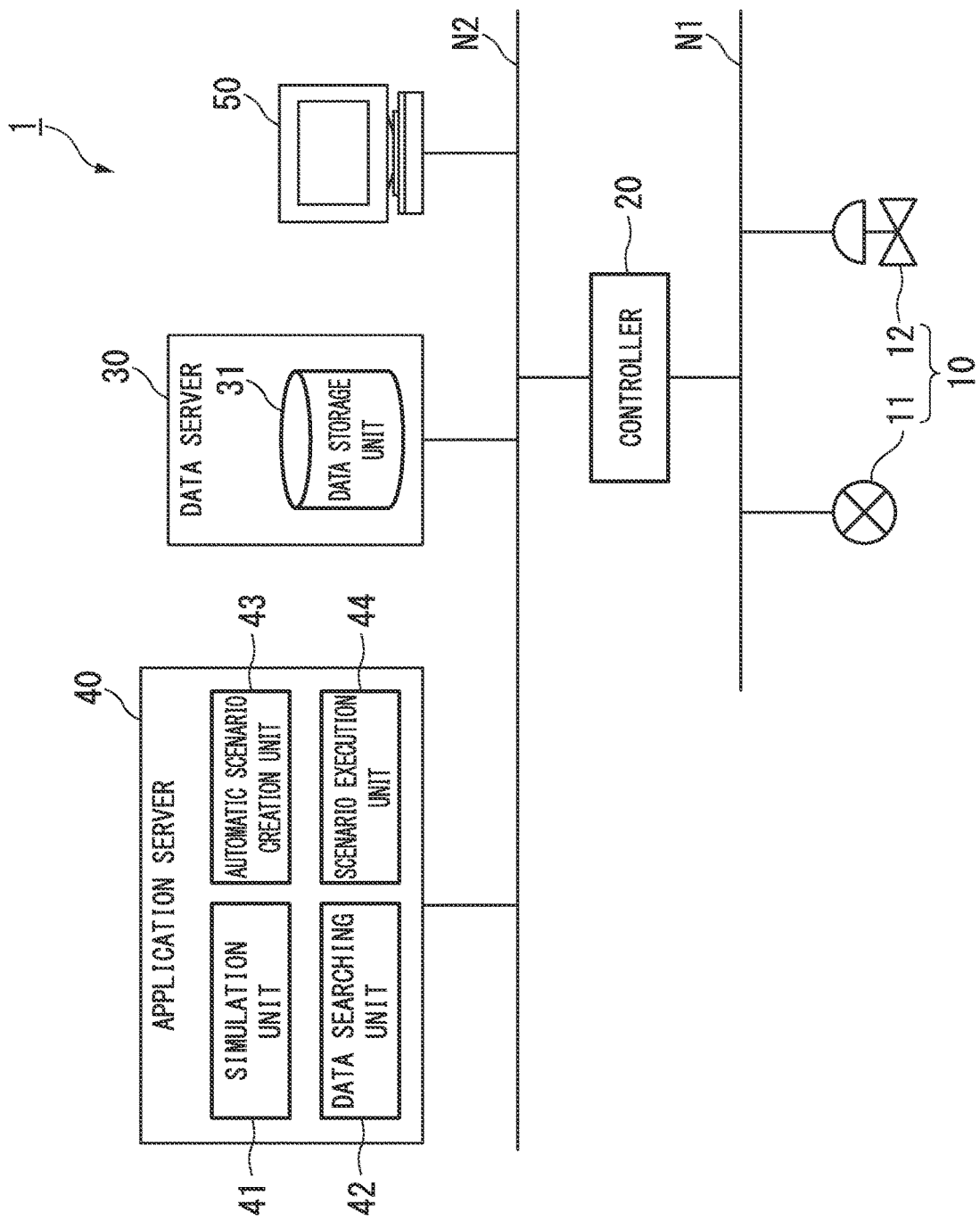
FIG. 1 is a block diagram illustrating the overall constitution of a process monitoring system in accordance with a first preferred embodiment of the present invention.

FIG. 1 is a block diagram illustrating the overall constitution of a process monitoring system in accordance with the first preferred embodiment of the present invention. As shown in FIG. 1, a process monitoring system 1 of the first preferred embodiment has field devices 10, a controller 20, a data server 30, an application server 40, and a monitoring terminal apparatus 50. The process monitoring system 1 monitors an industrial process implemented at a non-illustrated plant. The monitoring terminal apparatus 50 is also called a display unit.

The field devices 10 and the controller 20 are connected to a field network N1. The controller 20, the data server 30, the application server 40, and the monitoring terminal apparatus 50 are connected to a control network N2. The field network N1 is, for example, a cable network laid on-site throughout a plant. In contrast, the control network N2 is, for example, is a cable network connecting between on-site locations in the plant and a monitoring room. The field network N1 and the control network N2 may be wireless networks.

The field devices 10 are, for example, sensor devices such as flow gauges and temperature sensors, valve devices such as flow amount control valves and open/close values, actuator devices such as fans and motors, and other devices installed on-site in a plant. In FIG. 1, to facilitate understanding, of the field devices 10 installed in a plant, a sensor device 11 that measures the flow amount of a fluid and a valve device 12 that controls or manipulates the amount flow of a fluid are illustrated.

The above-described field devices 10 operate in accordance with the functions of field devices 10, under control of the controller 20. For example, the sensor device 11 transmits to the controller 20, via the field network N1, measurement data obtained by measuring the flow amount of a fluid, and the valve device 12 manipulates the flow amount of a fluid by adjusting the opening of a valve through which the fluid passes, under control of the controller 20.

The controller 20 controls the field devices 10 via the field network N1, and transmits to the data server 30, via the control network N2, various data obtained by controlling the field devices 10. For example, the controller 20 controls the sensor device 11 so as to obtain measurement data indicating the flow amount, and controls the valve device 12 in accordance with the obtained measurement data to adjust the opening of a valve. Also, data based on the measurement data obtained from the sensor device 11 and based on the control data with respect to the valve device 12 are transmitted to the data server 30. If there is an instruction from the monitoring terminal apparatus 50, the controller 20, for example, controls the field devices 10 in response to the instruction.

In this case, the data transmitted from the controller 20 to the data server 30 may be arbitrary data based on measurement data obtained from the above-described sensor device 11 and control data with respect to the valve device 12. The data transmitted from the controller 20 to the data server 30 is, for example, the following data (1) to (3).

(1) Measurement data sequentially obtained from the sensor device 11.

(2) Control data sequentially output to the valve device 12.

(3) Data that is calculated from at least one data from a plurality of measurement data obtained from at least one sensor device and a plurality of control data output to at least one valve device.

The data server 30 has a data storage unit 31 that is implemented by, for example, a large-capacity hard disk. The data storage unit 31 is also called the storage unit. The data server 30 stores in the data storage unit 31 various data obtained by the process monitoring system 1 and, upon request, provides data stored in the data storage unit 31. Specifically, the data server 30 stores in the data storage unit 31 in time-sequence order data such as the flow amount of a fluid, which indicates target values of state values in an industrial process and data illustrated by the above-described examples (1) to (3), which are sequentially transmitted from the controller 20.

The data server 30 stores as log data in the data storage unit 31 events occurring in the plant, the history of operations performed in the plant, and operating conditions. The operation history is, for example, the history of operations with respect to the flow amount of a fluid. The operating conditions are, for example, names, raw materials, and production quantities of products manufactured in a plant. In this case, the operation history of the log data includes information indicating operations performed when an abnormality occurs. For this reason, the log data stored in the data storage unit 31 also includes handling procedures performed in the past, such as procedures performed to restore the state of the plant.

The application server 40 has a simulation unit 41, a data searching unit 42, an automatic scenario creation unit 43, and a scenario execution unit 44. The simulation unit 41 is also called the prediction unit. The data searching unit 42 is also called the extraction unit. The automatic scenario creation unit 43 is also call the procedure data creation unit. The scenario execution unit 44 is also called the execution unit. The application server 40, using various data stored in the data server 30, provides information useful to an operator in the monitoring of an industrial process. Specifically, the application server 40 predicts from the currently obtained data an abnormality that can occur in the future, and provides a handling procedure or the like that can avoid the abnormality.

The simulation unit 41 has beforehand models of state quantities, such as the flow amount of a fluid, which are items of an industrial process to be monitored and controlled. The simulation unit 41 performs a simulation using data obtained output from the field devices 10 up until the present, this simulation being referred to as the "first simulation," and predicts the future time variation of the above-described state quantity. The simulation unit 41 also performs a simulation using, in addition to the data output from the field devices 10, a handling procedure extracted by the data extraction unit 42 and described later, this simulation being referred to as the "second simulation," and predicts time variation of a state quantity in the case of performing the above-described handling procedure. In this case, because the degree of variation of state quantities differs greatly, depending upon the type of state quantity, it is desirable to set, for each type of state quantity, for how far into the future the first and second simulations are to be predicted.

The data used by the simulation unit 41 in simulation is time-sequence data stored in the data storage unit 31 of the data server 30, rather than data directly output from the field devices 10 to the simulation unit 41. That is, the simulation unit 41 issues to the data server 30 a readout request for time-sequence data output from the field devices 10 and stored in the data storage unit 31. The simulation unit 41 then uses data output in response to the readout request from the data server 30 to perform the above-described first and second simulations.

The data searching unit 42 searches the data storage unit 31 provided in the data server 30 and extracts data. Specifically, the data searching unit 42 extracts from the data storage unit 31 of the data server 30 time-sequence data similar to the result of a first simulation performed by the simulation unit 41. The result of the first simulation indicates the future time variation of a state quantity. In this case, the data searching unit 42 extracts a plurality of time-sequence data similar to the result of the first simulation. When this is done, the data searching unit 42 extracts a pre-established number thereof, for example three, sequentially in order of having a higher similarity to the first simulation result.

The data searching unit 42 extracts log data of the period of time in which the extracted time-sequence data has been obtained, and extracts a handling procedure performed in that time period. In this case, if the data searching unit 42 has extracted a plurality of time-sequence data similar to the first simulation result, it extracts the log data of the period of time in which each of the extracted time-sequence data has been obtained, and extracts handling procedures performed in the time periods in which each of the time-sequence data has been obtained. The processing disclosed in Japanese Examined Patent Application, Second Publication No. H6-60826, Japanese Patent (Granted) Publication Nos. 3012297 and 3631118, and Japanese Unexamined Patent Application, First Publication No. 2007-11686 can be used as the processing performed by the simulation unit 41 and the data searching unit 42.

The automatic scenario creation unit 43, using events and the operation history included in the log data stored in the data storage unit 31, automatically creates a work scenario to be executed by an operator operating the monitoring terminal apparatus 50. In this case, the scenario is the procedure data of the work procedure performed by an operator in data form, which is executable by the scenario execution unit 44. The creation of such a scenario is for the purpose of reproducing work that is the same as the work performed in the past by the operator operating the monitoring terminal apparatus 50. The automatic scenario creation unit 43 creates a scenario upon an instruction for scenario creation by the monitoring terminal apparatus 50 or the like. The scenario created by the automatic scenario creation unit 43 is stored in the application server 40.

The scenario execution unit 44, of the scenarios created by the automatic scenario creation unit 43 and stored in the application server 40, executes a scenario instructed by the monitoring terminal apparatus 50 or the like. The scenario execution unit 44 executing the instructed scenario reproduces the operations established in the instructed scenario.

The monitoring terminal apparatus 50 is implemented by, for example, a computer having an input device such as a keyboard and a display device such as a liquid-crystal display device, is operated by an operator, and is used for process monitoring. The monitoring terminal apparatus 50, in addition to displaying various information provided from the data server 30 and the application server 40, issues instructions to the controller 20 and the application server 40 in response to operations by the operator.

Specifically, the monitoring terminal apparatus 50 displays the results of the first and second simulations performed by the simulation unit 41 of the application server 40, and the time-sequence data and handling procedures and the like extracted by the data searching unit 42. If the operator issues an instruction to execute a handling procedure, the monitoring terminal apparatus 50 instructs the application server 40 to execute a scenario for implementing the handling procedure as instructed by the operator.

Next, the operation of the process monitoring system 1 of the above-described constitution will be described. The operation of the process monitoring system 1 includes a first operation performed without conditions for extracting data being established in the data searching unit 42 of the application server 40, and a second operation performed with established conditions for extracting data in the data searching unit 42. In the following, general operation of the process monitoring system 1 will first be described, followed by descriptions of the first operation and the second operation.

(General Operation)

While the process monitoring system 1 is operating, state quantities in an industrial process implemented in a plant are measured, and data based on the measurement results and the like are stored as time-sequence data in the data storage unit 31 of the data server 30. In this case, data based on the measurement results and the like are data based on the above-described measurement data obtained from the sensor device 11 and the control data with respect to the valve device 12. Events occurring in the plant and a history of operations performed in the plant and the like are stored in the data storage unit 31 as log data.

For example, the above-described state quantities, for example, the flow amount of a fluid, is measured by a field device 10 such as the sensor device 11, and measurement data indicating the measurement results are sequentially collected by the controller 20. Also, control data is output from the controller 20 to another field device 10, for example, the valve device 12. Data calculated from the measurement data collected by the controller 20 and the control data output from the controller 20 are transmitted to the data server 30, and are stored as time-sequence data in the data storage unit 31.

During the above-described operations, if an instruction is made to create a scenario by an operator operating the monitoring terminal apparatus 50, events and operation history and the like included in the log data stored in the data storage unit 31 are referenced by the automatic scenario creation unit 43 in the application server 40, a scenario indicating a work procedure performed by an operator in the past is automatically created and stored in the application server 40. For example, if, by the operator operating the monitoring terminal apparatus 50, an operation had been executed in the past to reduce the flow amount of a fluid and increase the temperature of a fluid, a scenario having data indicating a procedure to reduce the flow amount of the fluid and data indicating a procedure to increase the temperature of the fluid is created and stored. When the automatic scenario creation unit 43 creates a scenario, information indicating that a scenario has been created is stored as log data in the data storage unit 31.

(First Operation)

Figure 2:
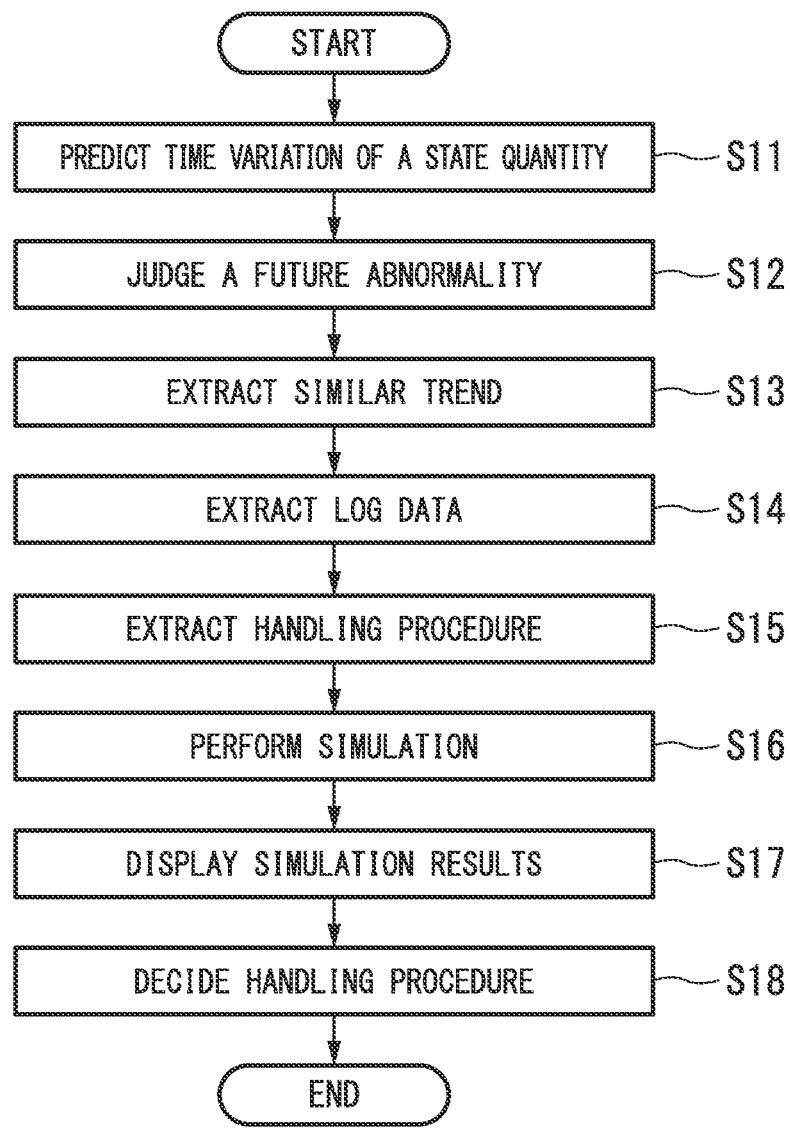
FIG. 2 is a flowchart illustrating the first operation in a process monitoring system in accordance with the first preferred embodiment of the present invention.
Figure 3:
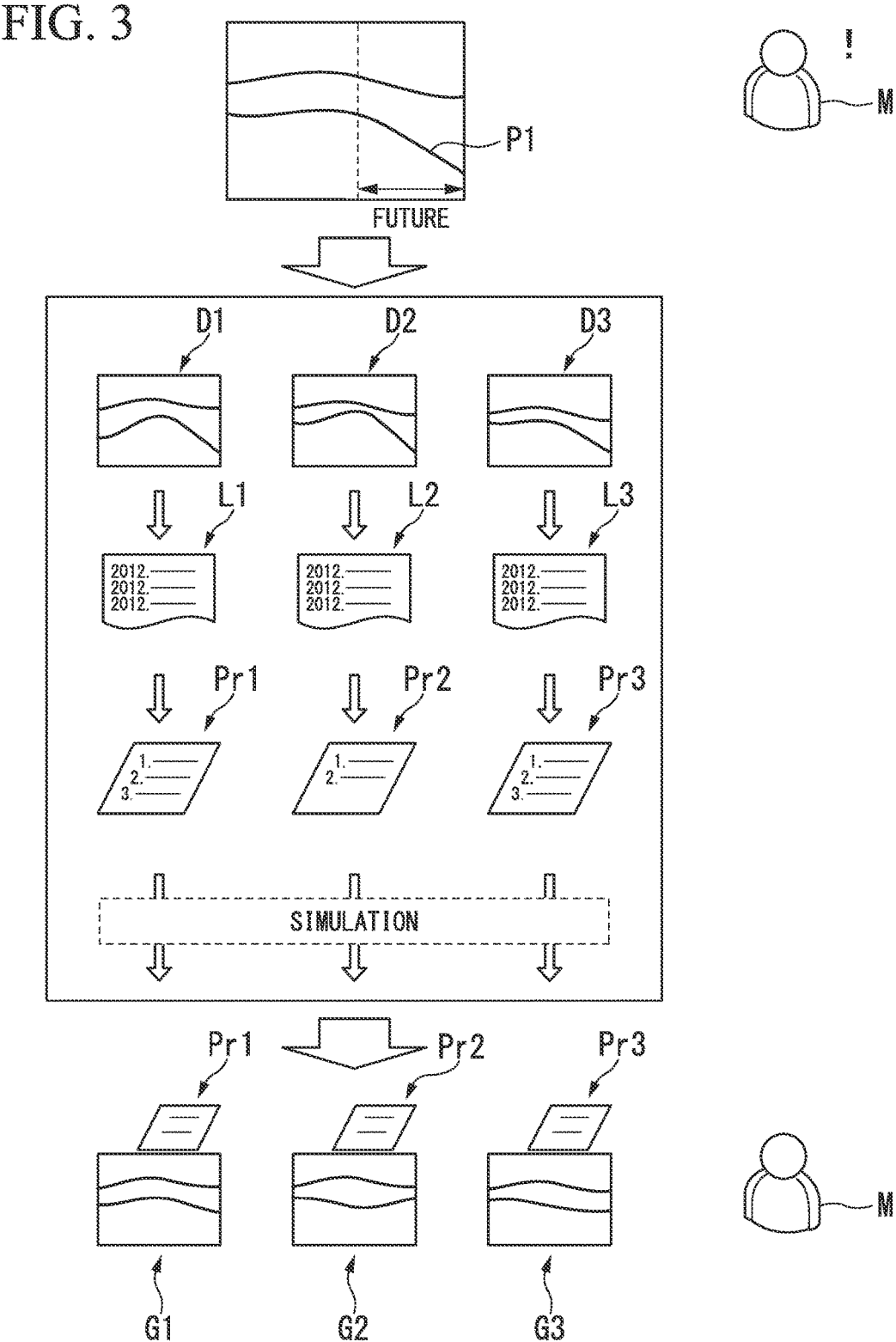
FIG. 3 is a drawing generally describing the first operation of the process monitoring system in accordance with the first preferred embodiment of the present invention.

FIG. 2 is a flowchart illustrating the first operation in a process monitoring system in accordance with the first preferred embodiment of the present invention. FIG. 3 is a drawing generally describing the first operation of the process monitoring system in accordance with the first preferred embodiment of the present invention.

(Step S11: Prediction Step)

First, when operation starts, the application server 40 reads out time-sequence data, and a first simulation is performed in the simulation unit 41. As a result, the future time variation of a state quantity such as the flow amount of a fluid is predicted. The time-sequence data read out from the data server 30 is data of the time-sequence data stored in the data server 30 that is the immediately previous time-sequence data required for the first simulation.

(Step S12)

When the above-described first simulation is performed, the results thereof are displayed as a trend graph on the monitoring terminal apparatus 50, and, based on the results, a judgment is made by the simulation unit 41 as to whether or not an abnormality will occur in the future. By display of the result of the first simulation on the monitoring terminal apparatus 50, the operator M shown in FIG. 3 can know the future time variation of a state quantity, and also can judge with regard to the existence of an abnormality. The judgment as to whether or not a future abnormality will occur may be made by a different function, rather than by the simulation unit 41.

If a judgment is made that a future abnormality will not occur, the processing shown in FIG. 2 ends.

(Step S13: Extraction Step)

If a judgment is made by the simulation unit 41 that a future abnormality will occur, the data searching unit 42 searches the data storage unit 31 of the data server 30 and extracts time-sequence data similar to the first simulation result.

For example, as shown by the curve marked with the symbol P1 in FIG. 3, if a significant future decrease in the flow amount is predicted, the data searching unit 42 searches the data storage unit 31 and extracts time-sequence data for a time when the flow amount was significantly decreased in the same manner in the past. When this is done, the data searching unit 42 extracts the three time-sequence data D1 to D3 having the greatest similarity with respect to the result of the above-described first simulation. Although, to simplify the description in this case, the description will be of an example in which the time-sequence data is extracted for one state quantity, such as flow amount, time-sequence data may be extracted for a plurality of state quantities, such as flow amount and temperature.

(Step S14: Extraction Step)

When time-sequence data is extracted, the data searching unit 42 searches the data storage unit 31 of the data server 30, and log data at the time period in which the extracted time-sequence data has been obtained is extracted.

(Step S15: Extraction Step)

Next, a handling procedure included in the extracted log data is extracted. In this case, because the three time-sequence data D1 to D3 have been extracted at step S13, the log data L1 to L3 for these time-sequence data D1 to D3 are each extracted, and each of the handling procedures Pr1 to Pr3 included in the log data L1 to L3 are extracted. The handling procedures Pr1 to Pr3 include information indicating the existence or non-existence of a scenario.

(Step S16)

When the above-described processing ends, a second simulation is performed in the simulation unit 41 of the application server 40. Specifically, the second simulation is performed using the immediately previous time-sequence data stored in the data storage unit 31 of the data server 30 and the handling procedure extracted at step S15, the time variation of the state quantity for the case of the handling procedure extracted at step S15 being predicted. In this case, because the three handling procedures Pr1 to Pr3 have been extracted at step S15, the second simulation is performed separately, using each of the handling procedures Pr1 to Pr3.

(Step S17: Display Step)

When the second simulation ends, the results thereof is displayed on the monitoring terminal apparatus 50. Specifically, as shown in FIG. 3, the handling procedures Pr1 to Pr3 extracted at step S15 and trend graphs G1 to G3 illustrating the second simulation results obtained at step S16 are associated with each other and displayed on the monitoring terminal apparatus 50. By displaying the handling procedures Pr1 to Pr3 in association with the trend graphs G1 to G3, the operator M can know the time variations of the state quantity in each of the cases of performing the handling by the handling procedures Pr1 to Pr3.

(Step S18)

Having referenced the display content displayed on the monitoring terminal apparatus 50, the operator M operates the monitoring terminal apparatus 50 to specify one of the trend graphs G1 to G3, that is, one of the handling procedures Pr1 to Pr3, thereby deciding which handling procedure is to be performed. When this is done, if the decided handling procedure includes information indicating the existence of a scenario, information indicating that scenario is transmitted from the monitoring terminal apparatus 50 to the application server 40. Then, in the scenario execution unit 44 of the application server 40, the handling procedure established in the scenario identified by the information transmitted from the monitoring terminal apparatus 50 is performed. If there is no information included in the identified handling procedure indicating that a scenario exists, the operator M may perform a procedure manually by operating the monitoring terminal apparatus 50 while referencing the decided handling procedure.

(Second Operation)

Figure 4:
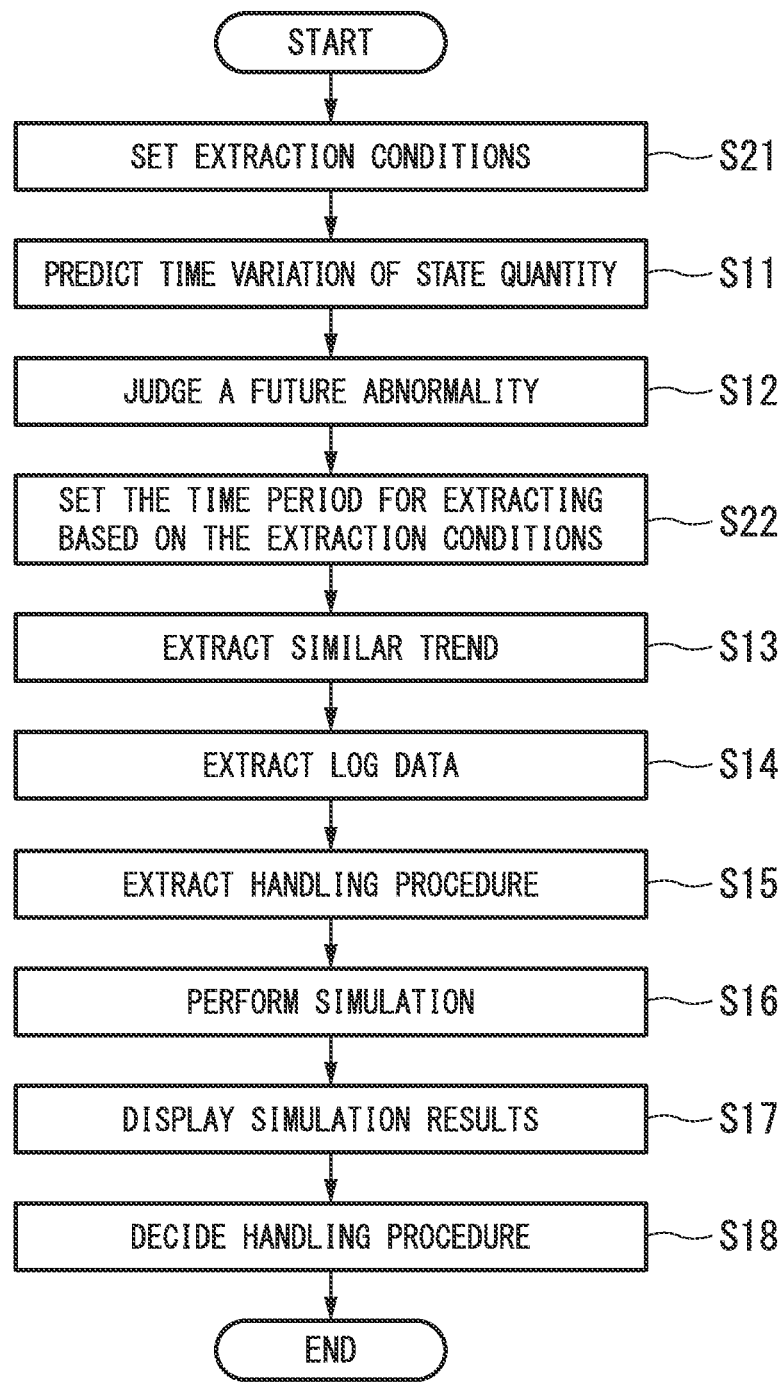
FIG. 4 is a flowchart illustrating the second operation of the process monitoring system in accordance with the first preferred embodiment of the present invention.

FIG. 4 is a flowchart illustrating the second operation of the process monitoring system in accordance with the first preferred embodiment of the present invention. In the flowchart shown in FIG. 4, a step S21 is provided before step S11 of the flowchart of FIG. 2, and a step S22 is provided between steps S12 and S13 thereof. Step S21 is a step that sets the conditions for extraction of time-sequence data similar to the result of the first simulation performed at step S13. In this case, although it is possible to set arbitrary extraction conditions at step S21, the name, raw materials, and production quantity or the like of the product manufactured in the plant can, for example, be set. Step S22 is a step that, based on the extraction conditions set at step S21, sets the time period, referred to below as the extraction time period, for extracting time-sequence data similar to the first simulation result.

In the above-described first operation, at step S13 in FIG. 2, simple extraction has been done of time-sequence data similar to the results of the first simulation performed by the simulation unit 41 from the time-sequence data stored in the data storage unit 31. For this reason, in the first operation, it is possible, for example, that time-sequence data from a time at which a product different from the product currently being manufactured is extracted, and it can also be envisioned that an appropriate handling procedure is not obtained. The second operation, by setting extraction conditions, obtains a more appropriate handling procedure.

(Step S21)

For example, if the operator operates the monitoring terminal apparatus 50 to instruct the setting of the extraction conditions, a setting screen for extraction conditions is displayed on the monitoring terminal apparatus 50. When the operator inputs the name, raw materials, and production quantity and the like of the product currently being manufactured in the plant, the extraction conditions are set.

(Step S11)

When the above-described settings are completed, a first simulation is performed in the simulation unit 41 of the application server 40, and the future time variation of a state quantity such as flow amount of fluid is predicted.

(Step S12)

The results thereof are displayed as a trend graph displayed on the monitoring terminal apparatus 50, and the simulation unit 41 judges whether or not an abnormality will occur in the future, based on the results.

(Step S22)

If the simulation unit 41 has judged that a future abnormality will occur, the data searching unit 42 sets the extraction time period, based on the extraction conditions set at step S21. Specifically, the data searching unit 42 searches the log data stored in the data storage unit 31 of the data server 30 so as to determine a period of time satisfying the extraction conditions set at step S21, and set that period of time as the extraction time period. For example, the time period in which a product having the same product name as the product currently being manufactured in the plant is set as the extraction time period.

(Step S13)

When the extraction time period is set, the data searching unit 42 searches the data storage unit 31 of the data server 30 and extracts time-sequence data similar to the result of the above-described first simulation within the extraction time period set at step S22. When the processing of step S13 is completed, the processing of steps S14 to S18 is performed in the same manner as in the above-described first operation.

As described above, in the first preferred embodiment, the future time variation of a state quantity is predicted by the first simulation, time-sequence data similar to the predicted time variation of the state quantity is extracted from the data storage unit 31 of the data server 30, a handling procedure performed when the extracted time-sequence data was obtained is extracted from the log data stored in the data storage unit 31, and the extracted handling procedure is displayed on the monitoring terminal apparatus 50, thereby enabling reproduction of a handling procedure performed in the past by an operator having a high level of experience. By doing this, even if the information obtained from a plant becomes diverse and grows in quantity, it is possible, without increasing the burden on the operator, to achieve process control that is highly accurate and highly efficient.

Although the foregoing has been the description of a process monitoring system and method in accordance with the first preferred embodiment of the present invention, the present invention is not restricted to the above-described preferred embodiment, and can be freely changed within the scope of the present invention. For example, for the scenario execution unit 44 to execute a scenario included in a handling procedure specified by an operator, that is, one of the handling procedures Pr1 to Pr3 in FIG. 3, fully automatic operation or semi-automatic operation may be performed. In automatic operation in this case, all the procedures included in the procedures to be performed at the instruction of an operator are performed automatically. In semi-automatic operation, only a procedure other than the procedures performed at the instruction of an operator is performed automatically.

Although, in the second operation in the above-described preferred embodiment, the description has been for an example in which the extraction conditions for time-sequence data similar to the result of the first simulation are set, extraction conditions may be set with respect to log data. For example, this could be the setting of extraction conditions that extract only a procedure of the manual procedures performed based on an instruction from an operator. Deletion, modification, and addition of handling procedure to be used in the second simulation may be done in accordance with an instruction from an operator.

It is also possible to omit the processing at steps S11, S13 and S14 as shown in FIG. 2 and FIG. 4. By selecting waveforms with similar characteristics, for example, from only the time-sequence data obtained in the past, it is possible to extract similar waveforms without performing the first simulation at step S11 shown in FIG. 2 and FIG. 4. For example, if continued operation of the plant operation causes the time variation of the similar state quantity to repeat a similar handling procedure, it is possible to derive the handling procedure without the processing at step S13, based on actual past results. It is also possible to propose an operation method having good results by performing a trial operation at high speed, that is, by performing repetition of a trial and error operation, based on the results such as design information or a HAZOP (hazard and operability study). By performing such trial operation at high speed, it is possible to omit the processing at steps S13 and S14.

In the case in which a plurality of pre-established handling procedures have been prepared, when these procedures are caused to be displayed on the monitoring terminal apparatus 50, they may be displayed sequentially in order of decreasing frequency of use of the handling procedures, or sequentially in order from the immediately previously used procedure. Alternatively, in the above-described second operation, for example, depending on the operating conditions of switching drive of names and raw materials and the like of products currently manufactured in a plant and the immediately previous operation, the sequence of displaying the handling procedures may be varied.

In the above-described preferred embodiment, although the description has been of an example in which the data server 30, the application server 40, and the monitoring terminal apparatus 50 are connected to the control network N2, these may be connected to the field network N1.

In the above-described preferred embodiment, although the description has been of an example in which the data server 30, the application server 40 and the monitoring terminal apparatus 50 are implemented as each separate device, at least two of these may implemented as one device. For example, the data server 30 and the application server 40 are implemented as one apparatus, or all of the data server 30, the application server 40 and the monitoring terminal apparatus 50 are implemented as one apparatus.

Alternatively, the simulation unit 41, the data searching unit 42, the automatic scenario creation unit 43, and the scenario execution unit 44 provided in the application server 40 are not necessarily implemented into one apparatus, and they may be implemented into separate apparatuses. The simulation unit 41 and the data searching unit 42, for example, are implemented into one apparatus, and the automatic scenario creation unit 43 and the scenario execution unit 44 are implemented into another apparatus.

The present invention provides a process monitoring system and method in which, even if the information obtained from a plant becomes diverse and grows in quantity, while decreasing the burden on operators, information useful for achieving process control that is highly accurate and highly efficient can be provided.

According to the first preferred embodiment of the present invention, the time variation of a state quantity is predicted using time-sequence data from the field device, time-sequence data similar to the predicted time variation of a state quantity is extracted from the time-sequence data stored into the storage unit, a handling procedure performed at the time in which the extracted time-sequence data is obtained is extracted from log data stored into the storage unit, and the extracted handling procedure is displayed on the display unit. As a result, even if the information obtained from a plant becomes diverse and grows in quantity, it is possible, while decreasing the burden on operators, to provide information useful for achieving process control that is highly accurate and highly efficient.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A process monitoring system comprising:
   a storage unit configured to store time-sequence data, which is output from a field device located in a plant for measuring a state quantity, and log data, which includes handling procedures performed in past;
   a prediction unit configured to predict a time variation of the state quantity by using the time-sequence data output from the field device;
   an extraction unit configured to extract the time-sequence data similar to the time variation of the state quantity, which has been predicted by the prediction unit, from the time-sequence data, which has been stored in the storage unit, the extraction unit being configured to extract the handling procedures, which has been performed at a time, when the time-sequence data that has been extracted is obtained, from the log data that has been stored in the storage unit; and
   a display unit configured to display the handling procedures that have been extracted by the extraction unit, wherein
   the prediction unit is configured to predict the time variation of the state quantity in a case, in which operations are performed by the handling procedures, by using the time-sequence data, which has been output from the field device, and the handling procedures, which has been extracted by the extraction unit, and
   the display unit is configured to display prediction results that have been predicted by the prediction unit in the case in which the operations are performed by the handling procedures.

2. The process monitoring system according to claim 1, further comprising:
   the field device.

3. The process monitoring system according to claim 1, wherein
   the extraction unit is configured to extract a plurality of time-sequence data and a plurality of handling procedures, and
   the prediction unit is configured to predict respectively the time variation of the state quantity in the case in which the operations by each of the plurality of handling procedures, which have been extracted by the extraction unit, are performed.

4. The process monitoring system according to claim 3, wherein
   the extraction unit is configured to extract, of the time-sequence data that has been stored in the storage unit, the data sequentially in order of having a higher similarity to the time variation of the state quantity that has been predicted by the prediction unit.

5. The process monitoring system according to claim 1, further comprising:
   a procedure data creation unit configured to create procedure data for executing the handling procedures by using the log data that has been stored in the storage unit; and
   an execution unit configured to execute the procedure data that has been created by the procedure data creation unit.

6. The process monitoring system according to claim 1, further comprising:
   a controller configured to control the field device in response to an instruction from the display unit, the controller being configured to transmit data obtained by controlling the field device to data server via a control network.

7. The process monitoring system according to claim 6, wherein
   the data transmitted from the controller to the data server includes at least one of:
   measurement data sequentially obtained from the field device;
   control data sequentially output to the field device; and
   data that is calculated from at least one data from a plurality of measurement data, which is obtained from at least one field device, and a plurality of control data, which is output to at least one field device.

8. The process monitoring system according to claim 1, further comprising:
a procedure data creation unit configured to create procedure data for executing the handling procedures by using the log data that has been stored in the storage unit; and
an execution unit configured to execute the procedure data that has been created by the procedure data creation unit.

9. A process monitoring method for monitoring an industrial process implemented at a plant comprising:
a prediction step of predicting a time variation of a state quantity in the industrial process by using time-sequence data output from a field device for measuring the state quantity;
an extraction step of extracting the time-sequence data similar to the time variation of the state quantity, which has been predicted in the prediction step, from the time-sequence data, which has been stored in a storage unit that stores time-sequence data which is output from the field device and log data which includes handling procedures performed in past, and extracting the handling procedures, which has been performed at a time, when the time-sequence data that has been extracted is obtained, from the log data that has been stored in the storage unit; and
a display step of displaying the handling procedures that have been extracted in the extraction step, wherein
the prediction step includes predicting the time variation of the state quantity in a case, in which operations are performed by the handling procedures, by using the time-sequence data, which has been output from the field device, and the handling procedures, which has been extracted by the extraction unit, and
the display step includes displaying prediction results that have been predicted by the prediction unit in the case in which the operations are performed by the handling procedures.

10. The process monitoring method according to claim 9, wherein
the extraction step includes extracting a plurality of time-sequence data and a plurality of handling procedures, and
the prediction step includes predicting respectively the time variation of the state quantity in the case in which the operations by each of the plurality of handling procedures, which have been extracted by the extraction unit, are performed.

11. The process monitoring method according to claim 10, wherein
the extraction step includes extracting, of the time-sequence data that has been stored in the storage unit, the data sequentially in order of having a higher similarity to the time variation of the state quantity that has been predicted in the prediction step.

12. The process monitoring method according to claim 9, further comprising:
a procedure step of creating procedure data for executing the handling procedures by using the log data that has been stored in the storage unit; and
an execution step of executing the procedure data that has been created by the procedure step.

13. A computer program product embodied on a non-transitory computer readable medium, the computer program product comprising:
instructions to store time-sequence data, which is output from a field device located in a plant for measuring a state quantity, and log data, which includes handling procedures performed in past, in a storage unit;
instructions to predict a time variation of the state quantity by using the time-sequence data output from the field device;
instructions to extract the time-sequence data similar to the time variation of the state quantity, which has been predicted, from the time-sequence data, which has been stored in the storage unit, and to extract the handling procedures, which has been performed at a time, when the time-sequence data that has been extracted is obtained, from the log data that has been stored in the storage unit;
instructions to display the handling procedures that have been extracted;
instructions to predict the time variation of the state quantity in a case, in which operations are performed by the handling procedures, by using the time-sequence data, which has been output from the field device, and the handling procedures, which has been extracted; and
instructions to display prediction results that have been predicted in the case in which the operations are performed by the handling procedures.

14. The computer program product according to claim 13, further comprising:
instructions to extract a plurality of time-sequence data and a plurality of handling procedures; and
instructions to predict respectively the time variation of the state quantity in the case in which the operations by each of the plurality of handling procedures, which have been extracted, are performed.

15. The computer program product according to claim 14, further comprising:
instructions to extract, of the time-sequence data that has been stored in the storage unit, the data sequentially in order of having a higher similarity to the time variation of the state quantity that has been predicted.

16. The computer program product according to claim 13, further comprising:
instructions to create procedure data for executing the handling procedures by using the log data that has been stored in the storage unit; and
instructions to execute the procedure data that has been created.

* * * * *